(12) United States Patent
Asnaashari et al.

(10) Patent No.: US 9,065,654 B2
(45) Date of Patent: *Jun. 23, 2015

(54) PARALLEL ENCRYPTION/DECRYPTION

(71) Applicant: Micron Technology, Inc., Boise, ID (US)

(72) Inventors: Mehdi Asnaashari, Danville, CA (US); Robin Sarno, Pleasanton, CA (US)

(73) Assignee: Micron Technology, Inc., Boise, ID (US)

(*) Notice: Subject to any disclaimer, the term of this patent is extended or adjusted under 35 U.S.C. 154(b) by 55 days.

This patent is subject to a terminal disclaimer.

(21) Appl. No.: 13/741,964

(22) Filed: Jan. 15, 2013

(65) Prior Publication Data

US 2013/0142326 A1 Jun. 6, 2013

Related U.S. Application Data

(63) Continuation of application No. 12/333,822, filed on Dec. 12, 2008, now Pat. No. 8,355,499.

(51) Int. Cl.
*H04L 9/28* (2006.01)
*H04L 9/06* (2006.01)

(52) U.S. Cl.
CPC .............. *H04L 9/28* (2013.01); *H04L 9/0631* (2013.01); *H04L 9/0637* (2013.01); *H04L 2209/12* (2013.01)

(58) Field of Classification Search
CPC ....... H04L 9/06; H04L 9/0687; H04L 9/0675; H04L 9/0606; H04L 9/18; H04L 9/00; H04L 9/30; H04L 9/0618; H04L 9/0631; H04L 9/0637; G06F 7/725

USPC .......................................... 380/28–30, 37, 42
See application file for complete search history.

(56) References Cited

U.S. PATENT DOCUMENTS

| 7,106,860 | B1 | 9/2006 | Yu et al. |
| 7,221,763 | B2 | 5/2007 | Verbauwhede |
| 7,526,085 | B1 | 4/2009 | Bong |
| 7,580,519 | B1 | 8/2009 | Goh |
| 7,636,439 | B2* | 12/2009 | Nakabayashi et al. .......... 380/46 |
| 7,685,434 | B2 | 3/2010 | Kaniz et al. |
| 8,010,801 | B2* | 8/2011 | Qi et al. ........................ 713/189 |
| 8,036,377 | B1 | 10/2011 | Poo et al. |
| 2002/0012430 | A1* | 1/2002 | Lim ................................ 380/29 |
| 2002/0048364 | A1* | 4/2002 | Gligor et al. .................... 380/37 |
| 2003/0198345 | A1 | 10/2003 | Van Buer |
| 2003/0202658 | A1 | 10/2003 | Verbauwhede |
| 2004/0128553 | A1 | 7/2004 | Buer et al. |
| 2006/0023877 | A1* | 2/2006 | Tsuruga .......................... 380/28 |
| 2006/0026377 | A1* | 2/2006 | Sikdar et al. .................. 711/170 |
| 2006/0056623 | A1 | 3/2006 | Gligor et al. |
| 2007/0081670 | A1* | 4/2007 | Topham et al. ............... 380/239 |

(Continued)

*Primary Examiner* — Nirav B Patel
(74) *Attorney, Agent, or Firm* — Brooks, Cameron & Huebsch, PLLC

(57) ABSTRACT

The present disclosure includes methods and devices for parallel encryption/decryption. In one or more embodiments, an encryption/decryption device includes an input logic circuit, an output logic circuit, and a number of encryption/decryption circuits arranged in parallel between the input logic circuit and the output logic circuit. For example, each encryption/decryption circuit can be capable of processing data at an encryption/decryption rate, and the number of encryption/decryption circuits can be equal to or greater than an interface throughput rate divided by the encryption/decryption rate.

18 Claims, 9 Drawing Sheets

(56) References Cited

U.S. PATENT DOCUMENTS

| | | |
|---|---|---|
| 2007/0237327 A1* | 10/2007 | Taylor et al. .................... 380/37 |
| 2007/0276756 A1* | 11/2007 | Terao et al. .................... 705/51 |
| 2008/0031454 A1 | 2/2008 | Verbauwhede |
| 2008/0065885 A1 | 3/2008 | Nagai et al. |
| 2008/0130872 A1* | 6/2008 | Bolotov et al. ................. 380/28 |
| 2008/0130881 A1* | 6/2008 | You et al. ........................ 380/46 |
| 2008/0187132 A1* | 8/2008 | Sung et al. ...................... 380/28 |
| 2008/0201574 A1 | 8/2008 | Haneda |
| 2008/0232581 A1 | 9/2008 | Elbaz et al. |
| 2008/0240423 A1 | 10/2008 | Gueron et al. |
| 2008/0247540 A1 | 10/2008 | Ahn et al. |
| 2009/0016525 A1* | 1/2009 | Bertoni et al. ................ 380/200 |
| 2010/0027783 A1 | 2/2010 | Yup |

* cited by examiner

US 9,065,654 B2

PARALLEL ENCRYPTION/DECRYPTION

PRIORITY APPLICATION INFORMATION

This application is a Continuation of U.S. application Ser. No. 12/333,822, filed Dec. 12, 2008, to be issued as U.S. Pat. No. 8,355,499, the specification of which is incorporated herein by reference.

TECHNICAL FIELD

The present disclosure relates generally to semiconductor memory devices, methods, and systems, and more particularly, to parallel encryption and decryption.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored information when not powered and can include NAND flash memory, NOR flash memory, read only memory (ROM), electrically erasable programmable ROM (EEPROM), erasable programmable ROM (EPROM), and phase change random access memory (PCRAM), among others.

Memory devices can be combined to form a solid state drive (SSD). An SSD can include non-volatile memory, e.g., NAND flash memory and NOR flash memory, and/or can include volatile memory, e.g., DRAM and SRAM, among various other types of non-volatile and volatile memory.

An SSD can be used to replace hard disk drives as the main storage device for a computer, as the SSD can have advantages over hard drives in terms of performance, size, weight, ruggedness, operating temperature range, and power consumption. For example, SSDs can have superior performance when compared to magnetic disk drives due to their lack of moving parts, which may ameliorate seek time, latency, and other electro-mechanical delays associated with magnetic disk drives. SSD manufacturers can use non-volatile flash memory to create flash SSDs that may not use an internal battery supply, thus allowing the drive to be more versatile and compact.

An SSD can include a number of memory devices, e.g., a number of memory chips (as used herein, "a number of" something can refer to one or more such things; for example, a number of memory devices can refer to one or more memory devices). As one of ordinary skill in the art will appreciate, a memory chip can include a number of dies. Each die can include a number of memory arrays and peripheral circuitry thereon. A memory array can include a number of planes, with each plane including a number of physical blocks of memory cells. Each physical block can include a number of pages of memory cells that can store a number of sectors of data.

Memory systems (e.g., a solid state drive) may be coupled to a host computer system by a communication interface (e.g., bus). Serial Advanced Technology Attachment (SATA) is a high speed serial computer bus primarily designed for transfer of data between the host computer system (e.g., motherboard) and mass storage devices, such as hard disk drives, optical drives, and solid state drives. SATA interfaces provide fast data transfer, ability to remove or add devices while operating (hot swapping when the operating system supports it), thinner cables that let air cooling work more efficiently, and reliable operation.

Whether to safeguard information stored in a portable memory system (such as a flash drive), or to protect the confidentiality of information stored in a memory system portion of a computer system (such as in an internal solid state drive), or as a means to secure data processing on an unsecured communications path (such as the Internet), encryption has been used to encode data. Various encryption/decryption algorithms exist. The Advanced Encryption Standard (AES) is a block cipher adopted as an encryption standard by the U.S. government, replacing its predecessor, the Data Encryption Standard (DES). AES is an encryption standard which non-strictly implements the Rijndael algorithm. AES is implemented as a symmetric block cipher with 128 bit data blocks and a key size that can be chosen from 128, 192, or 256 bits. AES may be implemented by software and/or hardware, may be relatively fast (relative to other encryption methodologies), is rather secure, is relatively easy to implement, and requires little memory. As an encryption standard, AES is currently being deployed on a large scale.

An AES engine receives an input (e.g., plaintext), and produces an encrypted output (e.g., ciphertext). There are several possible implementation modes of the AES standard. For example, the algorithm may be employed as an electronic code book (ECB), with no feedback. An implementation of the AES standard may have a high data rate. Several AES designs achieve a high data rate based on pipelined architectures when employing the AES algorithm as an ECB.

However, the AES standard is most often used in one of several feedback modes of operation for added security, including Cipher Block Chaining (CBC), Cipher Feedback (CFB), and Output Feedback (OFB). In these modes, the output of the AES algorithm is fed back to the input. The AES feedback modes of operation can introduce latencies to pipelined data processing.

DETAILED DESCRIPTION

Figure 1:
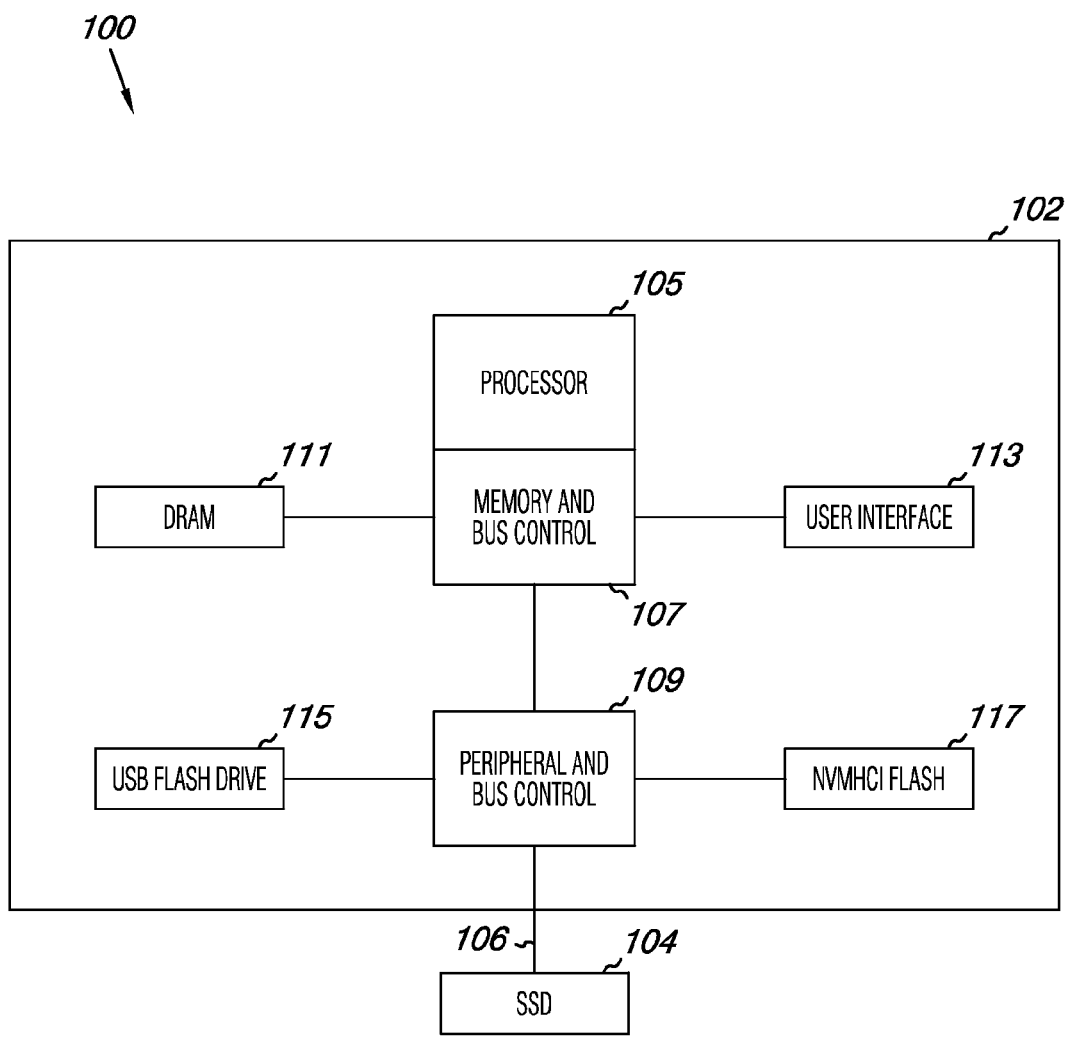
FIG. 1 is a functional block diagram of a computing system, in accordance with one or more embodiments of the present disclosure.

The present disclosure includes methods and devices for parallel encryption/decryption. In one or more embodiments, an encryption/decryption device includes an input logic circuit, an output logic circuit, and a number of encryption/decryption circuits arranged in parallel between the input logic circuit and the output logic circuit. For example, in some embodiments, each encryption/decryption circuit is capable of processing data at an encryption/decryption rate, and the number of encryption/decryption circuits is equal to or greater than an interface throughput rate divided by the encryption/decryption rate.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2, etc.

While parallel encryption apparatus and methods of the present disclosure may be described and illustrated as being implemented as part of a memory controller on a solid state drive having a SATA communication interface, the reader will appreciate that such an implementation is only one example implementation of many possible implementations and applications. The apparatus and methods of the present disclosure may be applied to other signal processing applications, including but not limited to, hardware and software implementations, memory storage systems involving magnetic, optical and other media, at various other physical and logical locations within a computing system, and as part of wired or wireless communication systems, among others. Implementations of the present disclosure within a memory system are not limited to a particular memory technology, e.g., flash. The reader will appreciate that although an example implementation is described herein, the apparatus and methods of the present disclosure may be applied to memory systems and devices using any type of memory backend, e.g., not just those utilizing flash memory devices.

FIG. 1 is a functional block diagram of a computing system, in accordance with one or more embodiments of the present disclosure. Computing system 100 includes a memory system 104, for example a solid state drive (SSD), coupled to host system 102. SSD 104 can be coupled to the host system 102 through a communication interface 106, e.g., a SATA interface. The host system 102 can include a number of separate integrated circuits, or more than one component or function can be on the same integrated circuit.

Host system 102 can include a processor 105 coupled to a memory and bus control 107. The processor 105 can be a microprocessor, or some other type of controlling circuitry such as an application-specific integrated circuit (ASIC). Other components of the computing system may also have processors. The memory and bus control 107 can have memory and other components directly coupled thereto, for example, dynamic random access memory (DRAM) 111, graphic user interface 113, or other user interface (e.g., display monitor, keyboard, mouse, etc.).

The memory and bus control 107 can also have a peripheral and bus control 109 coupled thereto, which in turn, can connect to a number of devices, such as such as a flash drive 115, e.g., using a universal serial bus (USB) interface, a non-volatile memory host control interface (NVMHCI) flash memory 117, and/or SSD 104. As the reader will appreciate, a SSD 104 can be used in addition to, or in lieu of, a hard disk drive (HDD) in a number of different computing systems. The computing system 100 illustrated in FIG. 1 is one example of such a system.

Figure 2:
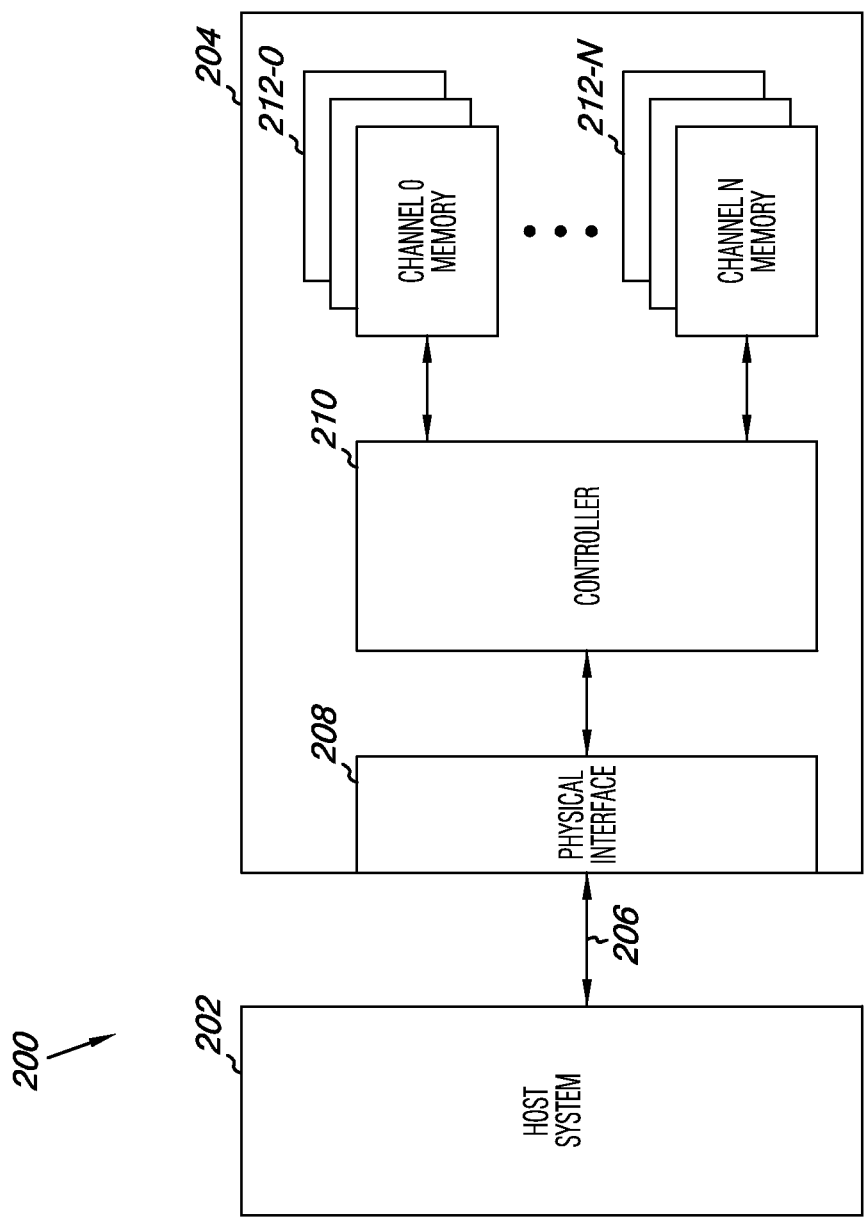
FIG. 2 is a functional block diagram of a computing system including at least one memory system, in accordance with one or more embodiments of the present disclosure.

FIG. 2 is a functional block diagram of a computing system having at least one memory system, in accordance with one or more embodiments of the present disclosure. Computing system 200 includes a memory system 204 (e.g., a SSD), coupled to host system 202. SSD 204 can be coupled to the host system 202 through a communication interface 206 (e.g., cable, bus), such as a serial advanced technology attachment (SATA) interface. SSD 204 can be analogous to the solid state drive described herein, e.g., solid state drive 104 in FIG. 1.

FIG. 2 illustrates the components and arrangement of one or more embodiments of a solid state drive 204, including a controller 210, a physical interface 208 (e.g., a connector), and a number of solid state memory devices 212-0, . . . , 212-N, each corresponding to a channel of the controller 210. As used herein, a memory device can include a number of memory cells, e.g., die, chip, array, or other group), that share control inputs, and may be fabricated using a memory type, e.g., NAND flash. Control inputs can generally include address latch enable (ALE), chip enable (CE), read enable (RE), ready/busy (RIB), write protect (WP), and input/output (I/O) connections such as pins, pads, or the like. In one or more embodiments, the SSD 204 can include an SSD housing to enclose the SSD 204, though such housing is not essential, for example, the host system 202 and SSD 204 may both be enclosed by a computing system housing.

SATA was designed as a successor to the Advanced Technology Attachment (ATA) standard, which is often referred to as Parallel ATA (PATA). First-generation SATA interfaces, also known as SATA/150 or unofficially as SATA 1, have an uppermost throughput rate of about 1.5 gigabits per second (GB/s), or 150 megabits per second (MB/s). Subsequently, a 3.0 GB/s signaling rate was added to the physical layer, effectively doubling the uppermost throughput rate from 150 MB/s to 300 MB/s. The 3.0 GB/s specification is also known as SATA/300 or unofficially as SATA II or SATA2. SATA/300's transfer rate may satisfy magnetic hard disk drive throughput requirements for some time; however, solid state drives using multiple channels of fast flash may support much higher throughput rates, so even faster SATA standards (e.g., 6 GB/s) may be implemented in supporting flash solid state drive read speeds.

The communication interface 206 can be used to communicate information between SSD 204 and another device, such as a host system 202. According to one or more embodiments, SSD 204 can be used as a mass data storage memory system in computing system 200. According to one or more embodiments, SSD 204 can be used as an external, and/or portable, memory system for computing system 200 (e.g., with plug-in connectivity). Thus, communication interface 206 can be a USB, PCI, SATA/150, SATA/300, or SATA/600 interface, among others.

The controller 210 can communicate with the solid state memory devices 212-0, . . . , 212-N to read, write, and erase data. The controller 210 can be used to manage the sensing, programming, and erasing of data in the SSD 204. Controller 210 can have circuitry that may be one or more integrated circuits and/or discrete components. For one or more embodiments, the circuitry in controller 210 may include control circuitry for controlling access across a number of channels (e.g., to a number of memory arrays) and/or for providing a translation layer between the external host system 202 and the SSD 204. Thus, the memory controller 210 can selectively communicate through a particular channel (not shown in FIG. 2) to a memory device.

The communication protocol between the host system 202 and the SSD 204 may be different than what is required for accessing a memory device e.g., solid state memory devices 212-0, . . . , 212-N. Memory controller 210 can process host command sequences and associated data, among others, into the appropriate channel command sequences, for example to store data.

According to one or more embodiments of the present disclosure, each solid state memory device 212-0, . . . , 212-N can include a number of memory cells. The solid state memory devices 212-0, . . . , 212-N can be formed using various types of volatile and/or non-volatile memory arrays (e.g., NAND flash, DRAM, among others). Memory devices 212-0, . . . , 212-N can include a number of memory cells that can be arranged to provide particular physical or logical configurations, such as a page, block, plane, die, array, or other group.

Figure 3:
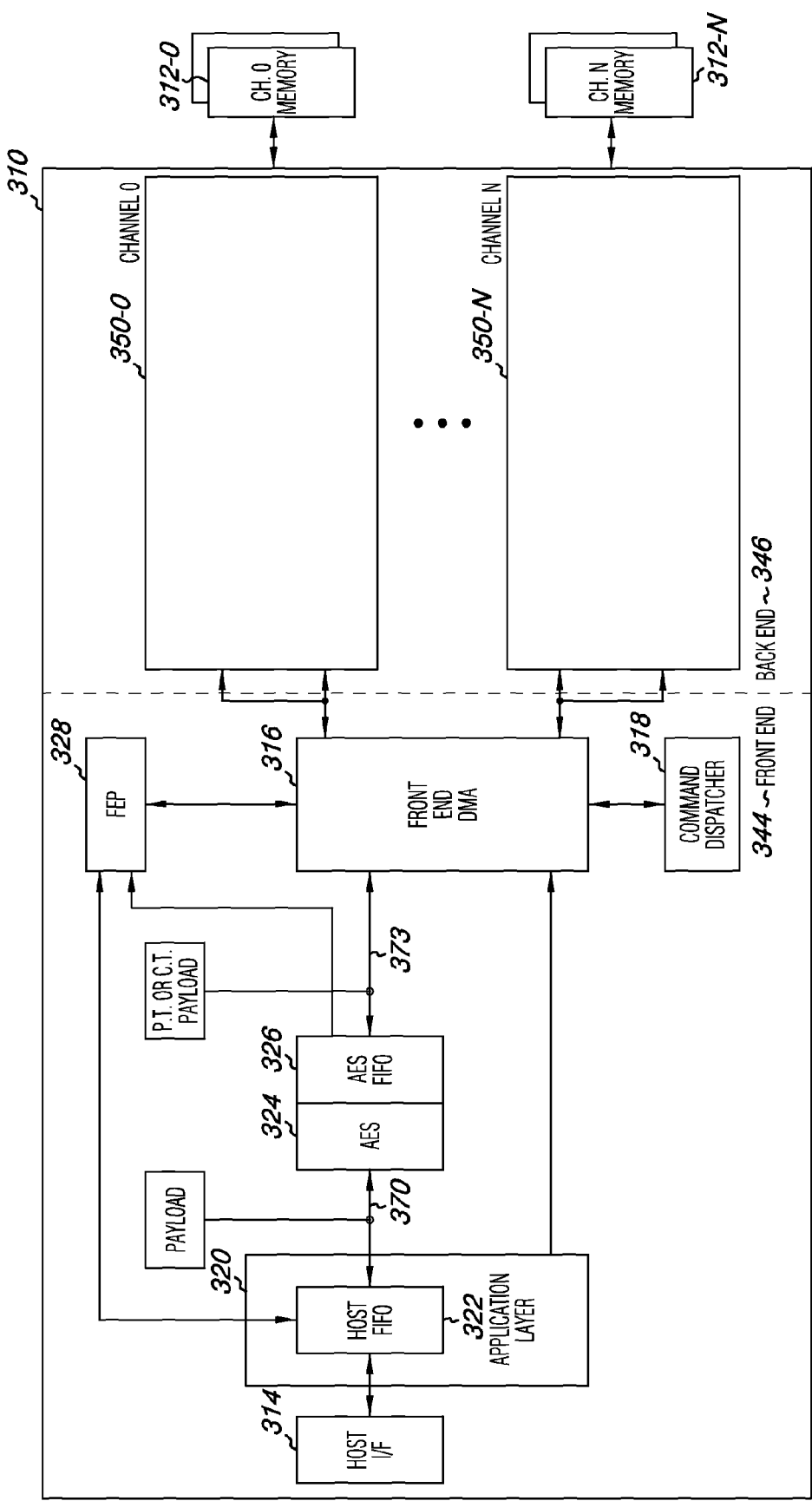
FIG. 3 is a functional block diagram of a memory system controller coupled to memory, in accordance with one or more embodiments of the present disclosure.

FIG. 3 is a functional block diagram of a memory controller communicatively coupled to a number of memory devices, in accordance with one or more embodiments of the present disclosure. As shown in FIG. 3, memory controller 310 is communicative coupled to a number (e.g., eight) of solid state memory devices, e.g., 312-0, . . . , 312-7. Each solid state memory device, e.g., 312-0, . . . , 312-7, corresponds to a channel, e.g., 350-0, . . . , 350-N, of the controller 310. As used herein, a memory device can include a number of memory cells that share control inputs, as previously discussed.

Each memory device, e.g., 312-0, . . . , 312-7, can be organized as previously described with respect to memory devices 212-0, . . . , 212-N, and can include one or more arrays of memory cells, e.g., non-volatile memory cells. In one or more embodiments, controller 310 can be a component of an SSD (e.g., controller 210 of SSD 204 shown in FIG. 2). The memory controller 310 can process commands and data, in the front end, and at the back end channels, in order to manage communications with memory devices, e.g., 312-0, . . . , 312-7, to sense (e.g., read), program (e.g., write), and/or erase data on the memory devices, e.g., 312-0, . . . , 312-7.

Controller 310 can include a front end portion 344 and a back end portion 346. As shown in FIG. 3, the front end portion 344 can include a host interface 314 communicatively coupled to a host buffer 322 (e.g., FIFO) of an application layer 320. For example, the controller host interface 314 is configured to communicate input and output data streams to a host system (e.g., 202 in FIG. 2) through the physical interface on a solid state drive (e.g., 208 in FIG. 2) and a communication interface (e.g., 206 in FIG. 2), such as a SATA interface. The communication interface (e.g., 206 in FIG. 2) can have a throughput rate associated therewith. The host interface 314 can also have a throughput rate associated therewith, which may be the same or different that the throughput rate of the communication interface (e.g., 206 in FIG. 2). According to one or more embodiments of the present invention, the host interface 314 can be configured to have a throughput rate equal to the throughput rate of the communication interface (e.g., 206 in FIG. 2). For example, the host interface 314 can be configured to have a throughput rate equal to that of a SATA interface communicatively coupling an SSD to a host system (e.g., 202 in FIG. 2).

The host FIFO 322 can be communicatively coupled to an encryption device 324 having one or more encryption engines (e.g., encryption engines implementing an AES algorithm). The encryption device 324 may be communicatively coupled to an encryption device buffer 326 (e.g., an AES FIFO). As illustrated in FIG. 3, the encryption device 324 may be configured to receive a data stream, such as a payload (e.g., a data stream derived from a number of data packets received to the controller 310) at an input 370, before encryption (e.g., plaintext).

Furthermore, the encryption device 324 may be arranged and configured to process (e.g., encrypt) the payload to provide at an output 373, through the encryption device buffer 326, to a front end direct memory access (DMA) 316. The encryption device 324 can provide at its output, either an unencrypted payload (e.g., plaintext abbreviated in FIG. 3 as P.T.), or an encrypted version of the payload (e.g., ciphertext abbreviated in FIG. 3 as C.T.), depending on whether encryption is required for a particular payload. The encryption device 324 (e.g., through the encryption device buffer 326) can be communicatively coupled to a front end processor (FEP) 328. The FEP 328 can also be communicatively coupled to the host buffer 322, and to the front end DMA 316.

The front end DMA 316 can be communicatively coupled to a command dispatcher 318. A controller may have a number of channel (e.g., 0, . . . , N) corresponding to a number of memory devices. The front end DMA 316 can effectively couple the front end 344 circuitry to the back end channels, e.g., back end channel 0 (350-0), . . . , back end channel N (350-N).

Referring now to the back end portion 346 of controller 310, the back end portion 346 can include a number of channels, e.g., 350-0, . . . , 350-N. Each back end channel can include a channel processor and a channel DMA, among other components, each back end channel being communicatively coupled to the front end DMA 316. As shown in FIG. 3, a particular memory device, e.g., 312-0, . . . , 312-7, corresponds to a channel, e.g., 350-0, . . . , 350-N, can be communicatively coupled to the controller 310.

Host interface 314 can be used to communicate information between controller 310, and a host system (e.g., 202 in FIG. 2; not shown in FIG. 3), for example through an physical interface (e.g., 208 in FIG. 2) and a communication interface, e.g., interface 206 in FIG. 2, such as a SATA interface. In one or more embodiments, information communicated between the host system (e.g., 202 in FIG. 2) and controller 310 can include one or more commands (e.g., program commands, sense commands, erase commands). The commands can be used to operate (e.g., program, sense, and/or erase data) the associated memory device.

Figure 4A:
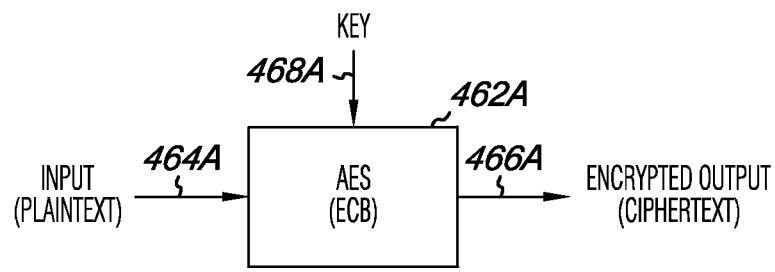
FIG. 4A is a functional block diagram of Advanced Encryption Standard (AES) engine operation in Electronic Code Book (ECB) mode, in accordance with one or more embodiments of the present disclosure.

FIG. 4A is a functional block diagram of Advanced Encryption Standard (AES) engine operation in Electronic Code Book (ECB) mode, in accordance with one or more embodiments of the present disclosure. As one having ordinary skill in the art will appreciate, the AES algorithm may be employed as an electronic code book (ECB), with no feedback. In ECB modes, an AES engine 462A (operating in ECB mode) receives data (e.g., plaintext) at an input 464A, and produces encrypted data (e.g., ciphertext), based on a key 468A, at an encrypted output 466A. Although an encryption process is illustrated in FIG. 4A, the reader will appreciate that the AES algorithm may also be used as an electronic code book (ECB), with no feedback, for decryption. For decryption, the AES engine 462A (operating in ECB mode) receives encrypted data (e.g., ciphertext) at an input, and produces decrypted data (e.g., plaintext), based on a key, at a decrypted output.

Figure 4B:
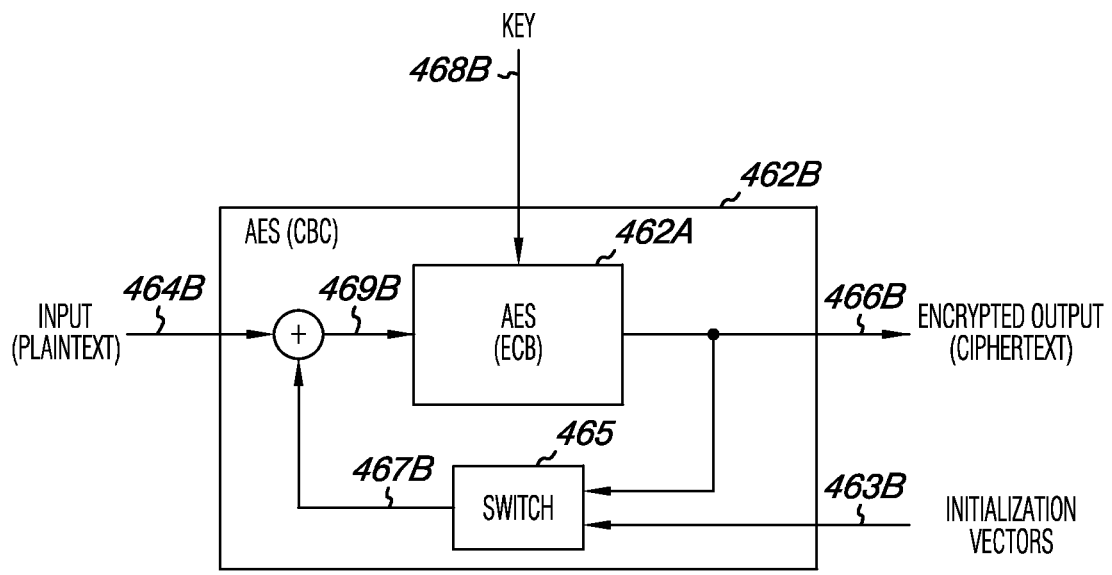
FIG. 4B is a functional block diagram of Advanced Encryption Standard (AES) engine operation in Cipher Block Chaining (CBC) mode, in accordance with one or more embodiments of the present disclosure.

FIG. 4B is a functional block diagram of Advanced Encryption Standard (AES) engine operation in Cipher Block Chaining (CBC) mode, in accordance with one or more embodiments of the present disclosure. As one having ordinary skill in the art will appreciate, the AES algorithm may be employed in Cipher Block Chaining (CBC) mode, where the output of the AES algorithm is fed back to the input. An AES engine 462B (operating in CBC mode) receives data (e.g., plaintext) at an input 464B, and produces encrypted data (e.g., ciphertext), based on a key 468B, at an encrypted output 466B.

Within the AES engine 462B (operating in CBC mode), some portion of the encrypted output 466B may be fed back and combined with input 464B to produce the input 469B to an AES engine 462A (operating in ECB mode). Because a subsequent input group of data to a particular AES engine 462B (operating in CBC mode) is encrypted using the feedback of some portion of encrypted output from a previous group of encrypted data by the particular AES engine 462B (operating in CBC mode), the groups of data input linked by feedback may be referred to as being "chained" together. Groups of data which will be linked together through feedback from one to the next may be referred to as being a chain, e.g., of input data.

The feedback loop for the AES engine 462A (operating in ECB mode) can include control logic, e.g., a switch, multiplexer, etc., to select between the encrypted output 466B (ciphertext) or initialization vectors 463B. According to one or more embodiments, the initialization vectors 463B are used, e.g., selected by switch 465, for combining, e.g., by an XOR function, with a first number of bytes of a chain to a particular AES engine 462B (operating in CBC mode), e.g., 16 bytes, and encrypted output 466B (ciphertext) is fed back and used for combining with a second number of bytes of a chain to a particular AES engine 462B (operating in CBC mode), e.g., the balance of bytes associated with a particular data packet. However, embodiments are not limited to using the initialization vectors 463B to the first 16 bytes, and the initialization vectors 463B may be used for combining with more or fewer bytes.

Initialization vectors used for encrypting data can be persistent since the same initialization vectors are used for decrypting the data. According to one or more embodiments, initialization vectors associated with encrypting a particular quantity of data may be stored, and retrieved for decrypting the data. According to one or more embodiments of the present disclosure, initialization vectors associated with encrypting a particular quantity of data may be generated for encrypting the data, and rather than being stored, re-generated for decrypting the data, thus saving having to store and protect associated initialization vectors.

According to one or more embodiments of the present disclosure, a hashed version of the logical block address (LBA) sectors is used for the generation of initialization vectors 463B, at the time of encryption, or decryption, of the data. However, if a standard, e.g., known, hashing algorithm is used, one could determine the initialization vectors from a known input, e.g., the LBA, compromising the encryption security. Therefore, according to one or more embodiments of the present disclosure, a confidential one-way hashing scheme can utilized to protect the encryption security. In this way, even if the input to the hashing algorithm becomes known, e.g., the LBA of the data, generation of the initialization vectors can remain confidential, thus maintaining the integrity of the encryption security. Multiple encryption engines may be used to each generate respective initialization vectors, or one encryption engine may be used to generate initialization vectors for each of multiple encryption engines.

However, embodiments of the present disclosure are not limited to such an implementation, and other methods for developing the initialization vectors 463B are contemplated. In one or more embodiments having multiple, e.g., parallel, AES engines 462B (operating in CBC mode), 64 byte portions of a sector are chained, so eight such 64-byte portions belonging to a same LBA may be chained together, using the hashed version of the LBA sector for the initialization vectors 463B of the first 64-byte portion, and using the same initialization vectors 463B for the other seven 64-byte portions as well. According to a number of embodiments, an LBA field can be extended by additional bits, e.g., three bits, which are hashed together to generate separate initialization vectors 463B for each 64-byte portion, all derived from the same sector LBA. According to one or more other embodiments, the initialization vectors 463B for the first 64-byte portion may be incremented, e.g., by one, to develop initialization vectors 463B for subsequent portions. Other methods for modifying the initialization vectors 463B from one portion to another are contemplated so that the initialization vectors 463B are variable from one portion to another.

Although a CBC mode encryption process is illustrated in FIG. 4B, the reader will appreciate that the AES algorithm may also be used in CBC mode, with feedback, for decryption. For decryption, the AES engine 462B (operating in CBC mode) receives encrypted data (e.g., ciphertext) at an input, and produces decrypted data (e.g., plaintext), based on a key, at a decrypted output. Some portion of the decrypted output is fed back and combined with the encrypted input to produce the input to the AES engine.

Figure 5:
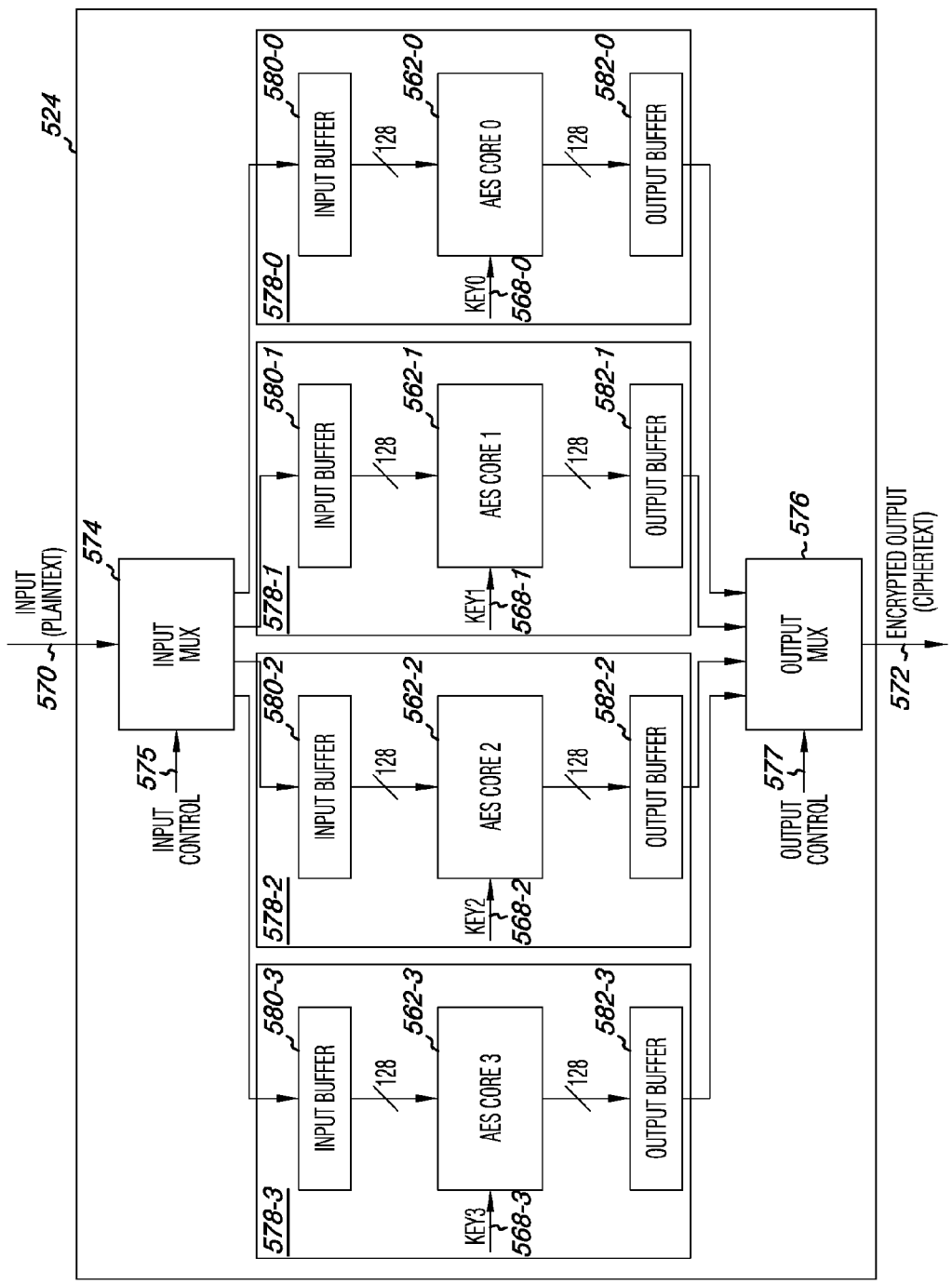
FIG. 5 is a functional block diagram of parallel encryption engines, in accordance with one or more embodiments of the present disclosure.

FIG. 5 is a functional block diagram of parallel encryption engines, in accordance with one or more embodiments of the present disclosure. According to one or more embodiments of an encryption device, multiple hardware encryption engines (e.g., AES engines) can be arranged and operated in a coordination with one another to increase the encryption throughput such that the encryption device can keep up with the high speed streamed data from a host system (e.g., 102 in FIG. 1, 202 in FIG. 2), and enable a controller (e.g., 210 in FIG. 2) to encrypt/decrypt data "on-the-fly" (e.g., at the uppermost rate of the communication interface between the host system and the memory system).

One configuration for arranging a number of encryption engines (e.g., AES engines) is in parallel. Then a first group of incoming streamed data may be directed to a first encryption engine, a second group of incoming streamed data may be directed to a second encryption engine, a third group of incoming streamed data may be directed to a third encryption engine, . . . , and an Nth group of incoming streamed data may be directed to a Nth encryption engine. The data allocation process may then be repeated as necessary, for example, in a round robin sequence such that a group of data at an input to a particular encryption engine is finished being transferred to the particular encryption engine has completed its previous encryption task and is ready to process another group of data.

For illustration purposes, apparatus and methods of the present disclosure are described in the context of encrypting data; however, one having ordinary skill in the art will appreciate from this disclosure that the apparatus and methods may be applied for the purposes of decrypting previously-encrypted data. Thus, as used herein, the term "encryption/decryption" denotes a general term encompassing encryption and/or decryption. That is, for example, an encryption/decryption device is to be interpreted as a device that may be implemented to achieve encryption, or to achieve decryption, or to achieve both encryption and decryption. Thus, "encrypting/decrypting" data is to be interpreted herein as denoting a general term encompassing encrypting and/or decrypting data. Furthermore, embodiments of the present disclosure may be described using one term, such as encryption, which is not intended to indicate an apparatus or method excludes the converse implementation, e.g., decryption. While reference is made herein to the Advanced Encryption Standard (AES), the reader will appreciate that AES techniques may be utilized to decrypt data, as well as encrypt data.

In addition, while a round robin sequence involving N encryption engines is disclosed with respect to a data distribution pattern, the particular order of distribution is not limiting, and any distribution order that achieves the principles of the present disclosure are contemplated. For example, data may be distributed to a first encryption engine, then to a third encryption engine, and then to a second encryption engine, etc. Data need not be distributed to all available encryption engines if not necessary to accommodate the rate at which data is received by the encryption device. For example, data may be distributed to only 3 of 4 encryption engines in a round robin sequence, if that is sufficient to process the rate of incoming data.

As shown in FIG. 5, and according to one or more embodiments of the present disclosure, an encryption device 524 includes an input logic circuit 574, e.g., an input multiplexer, an output logic circuit 576, e.g., an output multiplexer, and a number of encryption circuits, e.g., 578-0, 578-1, 578-2, 578-3, arranged in parallel between the input multiplexer 574 and the output multiplexer 576. Each encryption circuits, e.g., 578-0, 578-1, 578-2, 578-3, is capable of processing data at an encryption rate (e.g., 75 MB/s). The number of encryption circuits e.g., 578-0, 578-1, 578-2, 578-3, to be arranged in parallel depends on the encryption rate of the individual engines and the speed of the incoming data stream.

The input logic circuit 574 operates to parse the input data stream into a number of groups, and direct the number of groups to the number of encryption circuits according to a distribution order, such as in a round robin sequence. The output logic circuit operates to gather data groups from the encryption circuit outputs according to the round robin sequence and, direct the groups into an encrypted output data stream corresponding to an arrangement of the input data stream, e.g., in the same order by which the input data stream was parsed. While the input logic circuit 574 and output logic circuit 576 are shown in FIG. 5 each being implemented as a multiplexer, the reader will appreciate that the input logic circuit 574 and output logic circuit 576 may be implemented using other circuit elements or configurations for distributing the input data stream, or assembling encrypted outputs from the encryption circuits into an output data stream. For example, the input logic circuit could be implemented as a register loaded with a number of bits, from which a certain portion of the bits from the register are directed to each respective encryption circuit. Conversely, the output logic circuit may be a register having certain bit loaded from a respective encryption circuit, so as to assemble an encrypted version of the input data stream. One having ordinary skill in the art will appreciated that other logic circuits may likewise be implemented to distribute the input data stream and assemble the output data stream.

While encryption circuits discussed herein are taken to have the same encryption rate (e.g., data processing rate), embodiments of the present disclosure are not so limited, and an encryption circuit can have the same or different encryption rate as other parallel encryption circuits. However, different encryption rates will complicate the order and speed of the distribution of data groups thereto, the distribution pattern having to account for different speeds at which a particular encryption circuit may be ready for a next data group.

Furthermore, embodiments of the present disclosure are not limited to the encryption rates (e.g., 75 MB/s) used herein, and can be implemented using slower, or faster encryption rates, as may be achievable using other circuit geometries and fabrication techniques. The throughput of a particular encryption circuit, including an AES engine for example, is related to the process geometry and the clock frequency of the application, e.g., module, to which the encryption circuit is applied. Circuit footprint of each encryption circuit, as well as the total footprint associated with the number of encryption circuits are other considerations in determining encryption rate. For example, an encryption rate faster than 75 MB/s may be implemented using 180 nm technology and 6 layer metal fabrication techniques, thereby reducing the quantity of encryption circuits for achieving a given throughput rate; however, synthesizing an encryption circuit with an AES engine having double the 75 MB/s encryption rate may utilize three to four times more logic, e.g., buffers, etc., for a given process geometry node. Thus, doubling the encryption rate of an encryption circuit may half the quantity of encryption circuits, but in doing so may increase the circuit size, complexity, power usage, etc. of the encryption device.

According to various embodiments of the present disclosure, the number of encryption circuits e.g., 578-0, 578-1, 578-2, 578-3, is equal to or greater than an interface throughput rate (e.g., a SATA/300 rate of 300 MB/s) divided by the encryption rate (e.g., 75 MB/s). For example, given a controller with a SATA/300 interface to a host system with a throughput rate of 300 MB/s, and having encryption engines each with an encryption rate of 75 MB/s, at least 4 encryption circuits, working in parallel, can be used to encrypt data at the uppermost rate of the interface, e.g., "on the fly," in order to keep up with the host system. The incoming streamed data, e.g., from a host system, is distributed to the number of parallel encryption circuits, e.g., 578-0, 578-1, 578-2, 578-3 in a round robin sequence, and thereby divided amongst the respective encryption engines (e.g., AES encryption engines) of the encryption circuits, e.g., 578-0, 578-1, 578-2, 578-3.

According to another example for a controller with a SATA/300 interface to a host system with a throughput rate of 300 MB/s, but having encryption engines each with an encryption rate of 70 MB/s, at least 5 encryption circuits, working in parallel, will be needed to encrypt data at least at the uppermost rate of the interface, e.g., "on the fly," in order to keep up with the host system. Some encryption capacity may be underutilized in this arrangement. Embodiments of the present disclosure also contemplate utilizing fewer encryption engines than would be required to support the uppermost interface throughput rate, to provide a reduced combined data encryption rate, which may be sufficient in certain applications, or with adequate buffering to accommodate finite durations of uppermost throughput rates (but not continuous uppermost throughput rates).

Referring again to FIG. 5, encryption device 524 is configured to receive an input data stream (e.g., plaintext) at an input 570, and produces an encrypted data stream (e.g., ciphertext), based on one or more keys, e.g., 568-0, 568-1, 568-2, 568-3, at an encrypted output 572. The input 570 is coupled to the input of input multiplexer 574. The multiple outputs of input multiplexer 570 are respectively coupled to (an input of) each of the parallel encryption circuits, e.g., 578-0, 578-1, 578-2, 578-3. Input multiplexer 574 receives a control signal at an input control 575, by which input multiplexer 570 is controlled to parse the input data stream (e.g., plaintext) into groups of data (e.g., an amount of data that the respective encryption engines process as a unit), and distribute (e.g., direct) a group of data to each encryption circuit in a round robin sequence, such that a group of data at an input to a particular encryption engine is made available once the particular encryption engine has completed its previous encryption task and is ready to process another group of data. One having ordinary skill in the art will recognize that this distribution process may be accomplished by sequentially selecting to direct data from an input multiplexer input to one of the outputs of the input multiplexer.

The outputs of each of the parallel encryption circuits, e.g., 578-0, 578-1, 578-2, 578-3 is coupled to one of multiple inputs of the output multiplexer 576. Output multiplexer 576 receives a control signal at an output control 577, by which output multiplexer 576 is controlled to sequentially select one of its inputs from which to route data to its output. This data assembling process may be accomplished by selecting, in a round robin sequence, an input corresponding to an encryption circuit, e.g., 578-0, 578-1, 578-2, 578-3, having encrypted data emerging from an encryption process. In this manner, encrypted data, from the parallel encryption circuits, e.g., 578-0, 578-1, 578-2, 578-3, assembles the parsed, and now encrypted, data stream into an output data stream.

Each of the parallel encryption circuits, e.g., 578-0, 578-1, 578-2, 578-3, includes, coupled in series from input to output, an input buffer, e.g., 580-0, 580-1, 580-2, 580-3, an encryption engine, e.g., 562-0, 562-1, 562-2, 562-3, and an output buffer, e.g., 582-0, 582-1, 582-2, 582-3. According to one or more embodiments, the encryption engine, e.g., 562-0, 562-1, 562-2, 562-3, can be an encryption engine implementing an AES algorithm (e.g., an AES core) based on a key, e.g., 568-0, 568-1, 568-2, 568-3. The keys, e.g., 568-0, 568-1, 568-2, 568-3, received by the respective encryption engine, e.g., 562-0, 562-1, 562-2, 562-3, may all be the same key, but need not be. One having ordinary skill in the art will recognize that, where different keys are used, the data stream can be similarly parsed and directed to a decryption circuit utilizing a key corresponding to the key used to encrypt the group of data. Utilizing the same key in all parallel encryption engine can simplify the decryption process.

According to one or more embodiments, the input buffer, e.g., 580-0, 580-1, 580-2, 580-3, can be a number of registers each having a capacity equal to the quantity of data bits of the group into which the input data stream is parsed and directed to each encryption circuit. For example, the input buffer, e.g., 580-0, 580-1, 580-2, 580-3, can be four 16 byte registers to hold 64 bytes of data that can be chained together to supply one or more embodiments of an encryption engine operating in CBC mode. The input data stream from the host system (e.g., 102 in FIG. 1, 202 in FIG. 2) can be distributed to an encryption circuit faster than the AES engine process time, and thus, can be held in the input buffer, e.g., 580-0, 580-1, 580-2, 580-3, for the other CBC chains. According to one or more embodiments, an encryption circuit, e.g., 578-0, 578-1, 578-2, 578-3, operating in ECB mode, can be implemented having an input buffer, e.g., 580-0, 580-1, 580-2, 580-3, using two 16 byte registers; one for processing and one for holding the next 16 bytes.

According to one or more embodiments, the output buffer, e.g., 582-0, 582-1, 582-2, 582-3, can be a number of registers each having a capacity equal to the quantity of data bits of the group into which the input data stream is parsed and directed to each encryption circuit. As previously described, the quantity of bits of a group of data into which the input data stream is parsed, directed to each encryption circuit, may be set equal to the quantity of bits that are processed as a unit by the encryption engine, e.g., 562-0, 562-1, 562-2, 562-3. For example, for an encryption engine implementing a 128 bit AES algorithm, the incoming data stream may be parsed into 128 bit groups (e.g., sixteen 8-bit bytes), and the output buffer, e.g., 582-0, 582-1, 582-2, 582-3, can be, for example, two 16 byte registers.

Embodiments of the present disclosure are not limited to the quantities, or sizes, provided as examples above. For example, input and output registers may utilize more or fewer registers, of smaller or greater capacity, which may be compatible with the particular encryption engine used, number of parallel encryption circuits, data rates, and group size into which the incoming data stream is parsed and directed to the number of parallel encryption circuits. Some implementations of the present disclosure may use additional data buffering capabilities, such as where the uppermost encryption rate may be less than the uppermost throughput rate of a host system or communication interface between the host system and memory system within which the encryption device is incorporated.

Figure 6:
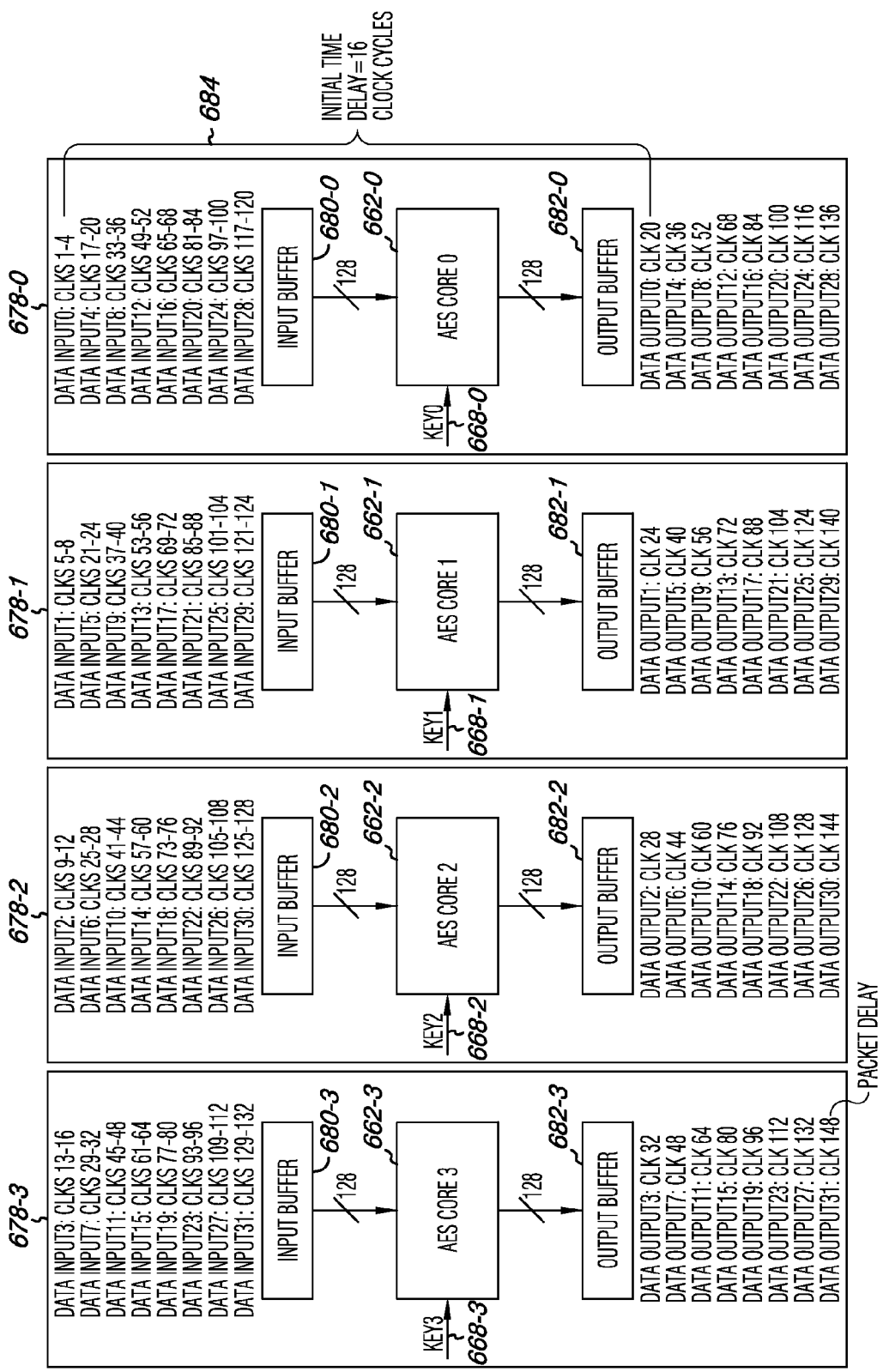
FIG. 6 is a functional flow diagram of parallel Advanced Encryption Standard (AES) engines operating in an Electronic Code Book (ECB) mode, in accordance with one or more embodiments of the present disclosure.

FIG. 6 is a functional flow diagram of parallel Advanced Encryption Standard (AES) engines in Electronic Code Book (ECB) mode, in accordance with one or more embodiments of the present disclosure. FIG. 6 shows a number of parallel encryption circuits, e.g., 678-0, 678-1, 678-2, 678-3, analogous to the encryption circuits, e.g., 578-0, 578-1, 578-2, 578-3, shown in FIG. 5. The corresponding circuitry of FIG. 5 that interconnects the encryption engines is omitted from FIG. 6 for clarity, as FIG. 6 is intended to illustrate the distribution and processing of data groups parsed from an input data stream.

As previously described with respect to FIG. 5, each of the parallel encryption circuits, e.g., 678-0, 678-1, 678-2, 678-3, includes, coupled in series from an input to an output, an input buffer, e.g., 680-0, 680-1, 680-2, 680-3, an encryption engine, e.g., 662-0, 662-1, 662-2, 662-3, and an output buffer, e.g., 682-0, 682-1, 682-2, 682-3. According to one or more embodiments, the encryption engine, e.g., 662-0, 662-1, 662-2, 662-3, can be an encryption engine implementing an AES algorithm (e.g., an AES core) in ECB mode (e.g., without feedback), based on a key, e.g., 668-0, 668-1, 668-2, 668-3, which may all be the same key, but need not be (e.g., may all be different keys).

In one or more embodiments, an encryption engine can implement a 128-bit AES algorithm (e.g., as illustrated in FIG. 6). Furthermore, each clock cycle can transfer 4 bytes (e.g., 32 bits at 8 bits per byte), and corresponding to the AES engine processing 128 bit (i.e., 16 bytes) groups at a time, the input data stream can be parsed into 16 byte groups. Therefore, 4 clock cycles, at 4 bytes per clock cycle, can be used to transfer the 16 byte group of parsed data from an input multiplexer to one of a number of encryption circuits, e.g., 678-0, 678-1, 678-2, 678-3.

For data that is transmitted across a communication interface (e.g., 206 in FIG. 2) between a host system (e.g., 202 in FIG. 2) and a memory system (e.g., SSD 204 in FIG. 2) in 512 byte packets (e.g., according to a SATA specification), one having ordinary skill in the art will appreciate that each 512 byte packet may be parsed into 32 groups of 16-byte data for distribution to the encryption circuits, e.g., 678-0, 678-1, 678-2, 678-3. Each group of data (i.e., 16 bytes) is represented as a DATA INPUT# or DATA OUTPUT# in FIG. 6 (e.g., DATA INPUT 0, DATA OUTPUT 31, etc.), along with the clock cycles associated with transferring that particular group of data.

From FIG. 6, the round robin distribution order of parsed input data, in 16 byte groups, is thus illustrated. For example, a first 16-byte group of data (DATA INPUT0) is shown distributed (e.g., directed by an input multiplexer) to the input of a first parallel encryption circuit, e.g., 678-0, during clock cycles 1-4. The next (e.g., second) 16-byte group of data (DATA INPUT1) parsed from an input data stream is shown distributed to the input of a second parallel encryption circuit, e.g., 678-1, during clock cycles 5-8. The next (e.g., third) 16-byte group of data (DATA INPUT2) is shown distributed to the input of a third parallel encryption circuit, e.g., 678-2, during clock cycles 9-12. The next (e.g., fourth) 16-byte group of data (DATA INPUT3) is shown distributed to the input of a fourth parallel encryption circuit, e.g., 678-3, during clock cycles 13-16. Then, the next (e.g., fifth) 16-byte group of data (DATA INPUT4) is shown distributed to the input of the first parallel encryption circuit, e.g., 678-0, during clock cycles 17-20, according to the round robin distribution order. This round robin sequence continues until the last (e.g., $32^{nd}$) 16-byte group of data (DATA INPUT31) is shown distributed to the input of the fourth parallel encryption circuit, e.g., 678-3, during clock cycles 129-132.

Considering the output end of the parallel encryption circuits, e.g., 678-0, 678-1, 678-2, 678-3, the reader will observe that encrypted data initially emerges from the first encryption circuit, e.g., 678-0, at clock cycle 20. Thus, an initial latency (e.g., 684) occurs that is attributable to the encryption process, of 16 clock cycles. One having ordinary skill in the art will appreciate that an AES encryption algorithm may be executed in various ways, for example using a number (e.g., 11, 13, 15) of rounds of data manipulation, each round being performed in one clock cycle. Thus, the 16 clock cycle initial latency includes not only the AES encryption algorithm, but also movement of data into, through (if necessary), and out of the input, e.g., 680-0, 680-1, 680-2, 680-3, and output, e.g., 682-0, 682-1, 682-2, 682-3, buffers.

According to one or more embodiments of the present disclosure, encrypted data is continuously transferred out of each of the parallel encryption circuits, e.g., 678-0, 678-1, 678-2, 678-3, at the same rate as it is being input. For example, the first 16-byte group of encrypted output data (DATA OUTPUT0) can be clocked out of the first encryption circuit, e.g., 678-0, over 4 cycles beginning with clock cycle 20 (i.e., clock cycles 20-23), then the next (e.g., second) 16-byte group of encrypted output data (DATA OUTPUT1) can be clocked out of the second encryption circuit, e.g., 678-1, over 4 cycles beginning with the next clock cycle 24 (i.e., clock cycles 24-27), and so on in a round robin sequence corresponding to the input round robin sequence, until the last (e.g., $32^{nd}$) 16-byte group of encrypted output data (DATA OUTPUT31) of a 512 byte packet can be clocked out of the fourth encryption circuit, e.g., 678-3, over 4 cycles beginning with clock cycle 148 (e.g., over clock cycles 148-151). As is indicated, the packet delay, from the time that a particular packet begins to be clocked into an encryption circuit, e.g., 678-0, until the last group of data begins to emerge from being encrypted, e.g., form encryption circuit 678-3, can be 148 clock cycles.

Figure 7:
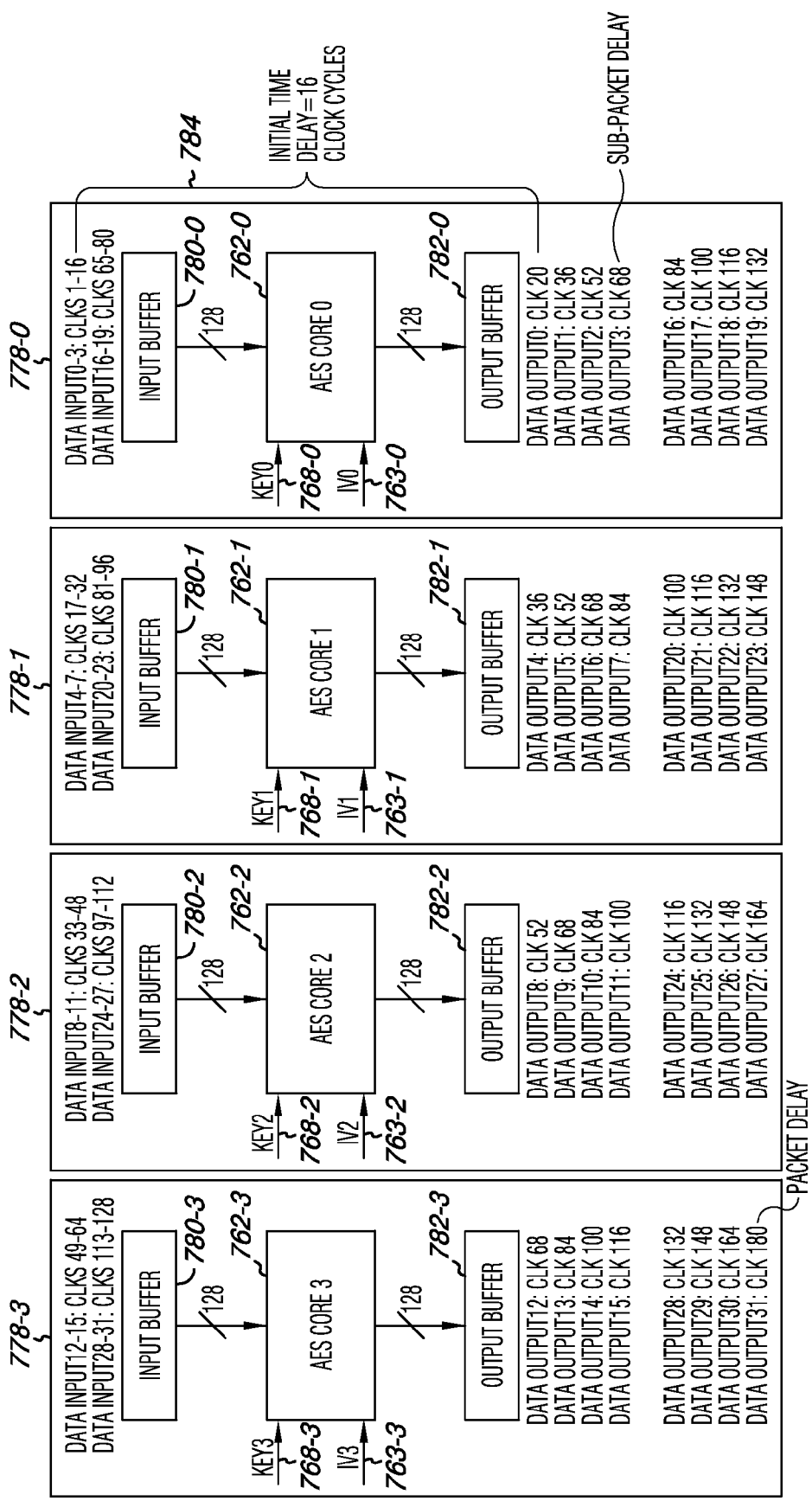
FIG. 7 is a functional flow diagram of parallel Advanced Encryption Standard (AES) engines operating in a Cipher Block Chaining (CBC) mode, in accordance with one or more embodiments of the present disclosure.

FIG. 7 is a functional flow diagram of parallel Advanced Encryption Standard (AES) engines in Cipher Block Chaining (CBC) mode, in accordance with one or more embodiments of the present disclosure. FIG. 7 shows a number of parallel encryption circuits, e.g., 778-0, 778-1, 778-2, 778-3, which may be analogous to the encryption circuits, e.g., 578-0, 578-1, 578-2, 578-3, shown in FIG. 5. The corresponding circuitry of FIG. 5 that interconnects the encryption engines is omitted from FIG. 7 for clarity, as FIG. 7 illustrates the distribution and processing of data groups parsed from an input data stream.

As previously described with respect to FIG. 5, each of the parallel encryption circuits, e.g., 778-0, 778-1, 778-2, 778-3, can include, coupled in series from an input to an output, an input buffer, e.g., 780-0, 780-1, 780-2, 780-3, an encryption engine operating in CBC mode, e.g., 762-0, 762-1, 762-2, 762-3, and an output buffer, e.g., 782-0, 782-1, 782-2, 782-3. According to one or more embodiments, the encryption engine can be an encryption engine implementing an AES algorithm with feedback (e.g., an AES core operating in CBC mode), based on a key, e.g., 768-0, 768-1, 768-2, 768-3, the AES algorithm being initialized using initialization vectors, e.g., 763-0, 763-1, 763-2, 763-3. The keys, e.g., 768-0, 768-1, 768-2, 768-3, to the respective encryption circuits, e.g., 578-0, 578-1, 578-2, 578-3, may all be the same key, but need not be (e.g., one or more keys may be different keys from one another).

According to the encryption method embodiment illustrated in FIG. 7, each encryption engine implements a 128-bit AES algorithm. In addition, due to the feedback component of an AES algorithm operating in CBC mode, a number of sequential data groups can be processed together through each encryption engine, e.g., 762-0, 762-1, 762-2, 762-3. The data flow illustrated in FIG. 7 is based on 4 sequential groups of data being processed through (e.g., associated by feedback from one group to a following group according to the AES algorithm in CBC mode) each encryption engine, e.g., 762-0, 762-1, 762-2, 762-3. However, embodiments of the present disclosure are not so limited, and a different number of sequential data groups may be processed together through each encryption engine, e.g., 762-0, 762-1, 762-2, 762-3. That is, while the example described above illustrates 64-byte CBC chains, e.g., comprised of four 16-byte groups, embodiments of the present disclosure may be implemented using variable length CBC chains, e.g., of greater or fewer than 64-byte chains, and CBC chain length may be different between encryption engines, or may differ between encryption of different packets, etc. Embodiments of the present disclosure are not limited to encryption engines operating in only an EBC or CBC modes, or to encryption engines implementing an AES algorithm.

In one or more embodiments, each clock cycle can transfer 4 bytes (i.e., 32 bits at 8 bits per byte), and corresponding to the AES engine processing (e.g., encrypting, decrypting) 128 bit (i.e., 16 bytes) blocks at a time, the input data stream can be still parsed into 16 byte groups. Therefore, 4 clock cycles, at 4 bytes per clock cycle, are used to transfer the 16 byte group of parsed data (e.g., from an input multiplexer to a particular encryption circuit, e.g., 778-0, 778-1, 778-2, 778-3).

For data transmitted across a communication interface (e.g., 206 in FIG. 2) between a host system (e.g., 202 in FIG. 2) and a memory system (e.g., SSD 204 in FIG. 2) in 512 byte packets, each 512 byte packet may be parsed into 32 groups of 16-byte data for distribution to one of the encryption circuits, e.g., 778-0, 778-1, 778-2, 778-3. Each group of data (i.e., 16 bytes) is represented as a DATA INPUT# or DATA OUTPUT# in FIG. 7 (e.g., DATA INPUT 0, DATA OUTPUT 31, etc.), along with the clock cycles associated with transferring that particular group of data.

From FIG. 7, the reader can see how the round robin distribution of parsed input data, in 16 byte groups, is accomplished. As previously discussed, because of the feedback features of an AES algorithm operating in CBC mode, 4 sequential groups of parsed data are distributed (e.g., directed) together to a particular one of the number of encryption circuits, e.g., 778-0, 778-1, 778-2, 778-3, rather than the single 16-byte parsed data group illustrated in FIG. 6. The round robin sequence involves distributing 4 groups of data to an encryption circuit, e.g., 778-0, then distributing the next 4 groups of data to the next encryption circuit in the round robin sequence, e.g., 778-1, etc. The reader will appreciate that the round robin sequence is based on distributing to each encryption circuit a number of groups of data so that an output from AES encrypting can be fed back to the input of the next sequential group of data to be processed by a particular encryption engine.

For example, a first 16-byte group of data (DATA INPUT0) is distributed (e.g., directed by an input multiplexer) to the input of a first parallel encryption circuit, e.g., 778-0, during clock cycles 1-4. However, the next (e.g., second) 16-byte group of data (DATA INPUT1) parsed from an input data stream is also distributed to the input of the first parallel encryption circuit, e.g., 778-0, during clock cycles 5-8. The next two (e.g., third and fourth) 16-byte groups of data (DATA INPUT2 and DATA INPUT 3) are likewise distributed to the input of the first parallel encryption circuit, e.g., 778-0, during clock cycles 9-12 and 13-16 respectively. Thus, as indicated on FIG. 7, DATA INPUT0-3 are parsed from the input data stream and distributed to the input of the first parallel encryption circuit, e.g., 778-0, during clock cycles 1-16.

Then, the round robin sequence moves to the next parallel encryption circuit, e.g., 778-1, for example by the input multiplexer (e.g., 574 in FIG. 5) selecting its output connected thereto. The next (e.g., fifth) 16-byte group of data (DATA INPUT4) is distributed to the input of the second parallel encryption circuit, e.g., 778-1, during clock cycles 17-20, followed by the next 3 (e.g., sixth, seventh and eighth) 16-byte groups of data (DATA INPUT5, DATA INPUT6 and DATA INPUT 7) are likewise distributed to the input of the second parallel encryption circuit, e.g., 778-1, one after another, during clock cycles 21-24, 25-28, and 29-32 respectively). Thus, as indicated on FIG. 7, DATA INPUT4-7 are parsed from the input data stream and distributed to the input of the second parallel encryption circuit, e.g., 778-1, during clock cycles 17-32.

In a similar manner, DATA INPUT8-11 are parsed from the input data stream and distributed to the input of the third parallel encryption circuit, e.g., 778-2, during clock cycles 33-48, and DATA INPUT12-15 are parsed from the input data stream and distributed to the input of the fourth parallel encryption circuit, e.g., 778-3, during clock cycles 49-64. According to the round robin sequence, the first parallel encryption circuit is again selected, and DATA INPUT16-19 are parsed from the input data stream and distributed to the input of the first parallel encryption circuit, e.g., 778-0, during clock cycles 65-80. The above-described round robin distribution continues until data groups parsed from a received packet (e.g., 512 bytes) are distributed as shown in FIG. 7.

Considering the output end of the parallel encryption circuits, e.g., 778-0, 778-1, 778-2, 778-3, the reader will observe that encrypted data initially emerges from the first encryption circuit, e.g., 778-0, at clock cycle 20. Thus, an initial latency (e.g., 784) occurs that is attributable to the encryption process, of 16 clock cycles. The first group of data (of four groups of data distributed in sequence to an encryption engine) is encrypted essentially in an ECB mode (e.g., without feedback) since it does not follow a group through the encryption engine from which feedback may be obtained. The initial latency (e.g., 784) shown in FIG. 7 is the same as shown in FIG. 6, (e.g., 684), 20 clock cycles.

However, unlike the encryption engines shown in FIG. 6, e.g., 662-0, 662-1, 662-2, 662-3, implementing an AES algorithm operating in ECB mode, the parallel encryption engines shown in FIG. 7, e.g., 762-0, 762-1, 762-2, 762-3, implementing an AES algorithm operating in CBC mode can introduce some additional delay attributable to some of the parallel encryption circuits, e.g., 778-1, 778-2, 778-3, sitting idle while awaiting to receive an initial group of data. For example, the second parallel encryption circuit, e.g., 778-1, does not receive its initial data group, as shown in FIG. 7, until clock cycle 17, which represents an additional delay of 12 clock cycles from the time the second parallel encryption circuit, e.g., 678-1, received its initial data group, as shown in FIG. 6. The other parallel encryption circuits, e.g., 778-2, 778-3, experience similarly-caused initial delays (in addition to the 16 clock cycle initial latency of the first encryption circuit).

The reader can see from FIG. 7 that the packet delay for an encryption device implementing an AES algorithm operating in CBC mode is 180 clock cycles according to one or more embodiments of the present disclosure. The additional encryption processing delay associated with an encryption device implementing an AES algorithm operating in CBC mode over an encryption device implementing an AES algorithm operating in ECB mode is 180-148=32 clock cycles. Of course, this additional encryption processing delay is the consequence for obtaining the benefit of encryption using feedback (e.g., additional security). The actual delay depends on a number of design criteria, including the number of parallel encryption circuits, the type and mode of encryption employed, and the quantity of sequential groups distributed at each stop of the round robin sequence (e.g., more chaining results in more latency). Other aspects of the encryption circuits shown in FIG. 7, e.g., 778-0, 778-1, 778-2, 778-3, are similar to the encryption circuits shown in FIG. 6, e.g., 678-0, 678-1, 678-2, 678-3, such as keys and buffer configuration.

Figure 8A:
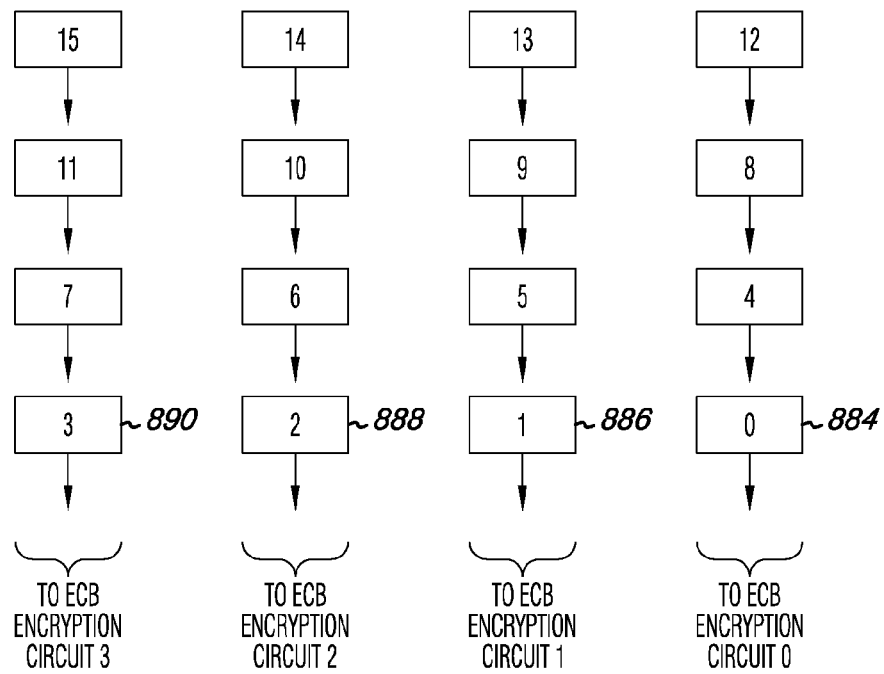
FIG. 8A is a functional flow diagram illustrating distribution of data groups to parallel Advanced Encryption Standard (AES) engines operating in an Electronic Code Book (ECB) mode, in accordance with one or more embodiments of the present disclosure.

FIG. 8A is a functional flow diagram illustrating distribution of data groups to parallel Advanced Encryption Standard (AES) engines operating in an Electronic Code Book (ECB) mode, in accordance with one or more embodiments of the present disclosure. FIG. 8A further illustrates an encryption method analogous to that which was described above with respect to FIG. 6. FIG. 8A shows a distribution of a number of data groups, omitting the encryption apparatus for clarity.

An encryption method according to one or more embodiments of the present disclosure can include parsing an input data stream into a number of groups (e.g., 0-15). The data groups are numbered in FIG. 8A in the order that they are parsed from the input data stream (e.g., 0, 1, ..., 15). FIG. 8A illustrates the distribution of the number of groups to a number of associated ECB encryption circuits. For example, a first data group 884 (e.g., data group 0) is shown being directed to ECB encryption circuit 0, a second data group 886 (e.g., data group 1) is shown being directed to ECB encryption circuit 1, a third data group 888 (e.g., data group 2) is shown being directed to ECB encryption circuit 2, and a fourth data group 890 (e.g., data group 3) is shown being directed to ECB encryption circuit 3.

This round robin distribution of individual data groups per round robin selection of the destination circuit continues with the data groups of a packet (e.g., data groups 4-15 for a 512 byte packet and 16 byte data groups). That is, the number of groups are distributed in a round robin sequence among a number of parallel encryption circuits operating in an electronic codebook mode, one data group being distributed per each selection of a particular encryption circuit at in the round robin sequence. The reader can see that the above-described distribution sequence continues with data group 4 being directed to encryption circuit 0, in sequence behind data group 0.

Each group is processed one at a time through its respective one of the number of parallel encryption circuits, for example at a data processing rate. There is no feedback between respective groups, since the encryption circuits are operating in ECB mode. It is desirable that the number of groups are distributed to the number of parallel encryption circuits such that transfer of a next group to a particular encryption circuit is completed just as processing of the preceding group by the encryption circuit is completed (e.g., distribution of data group 4 is completed just as encryption circuit 0 completes processing data group 0 and is ready to process a next data group).

Assuming the input data stream is derived from a Serial Advanced Technology Attachment (SATA) interface having an uppermost throughput rate, the number of parallel encryption circuits needed for "on the fly" (e.g., continuous) encryption is at least the uppermost throughput rate divided by the data processing rate. For example, assuming a SATA interface uppermost throughput rate of 300 MB/s, and a data processing rate is 75 MB/s, then the number of parallel encryption circuits to provide continuous encryption capability is at least four.

FIG. 8A shows distribution of a number of data groups to four ECB encryption circuits, as an example. Stated in the abstract, the number of groups can be distributed among N parallel encryption circuits. In order to maintain continuous encryption, a data group needs to be distributed to one of the number of encryption circuits each T clock cycles, where processing one of the number of groups at a time through an encryption circuit takes N times T clock cycles. For example (and as shown in FIG. 6), given 4 (e.g., N) encryption circuits and a data processing rate through an encryption circuit of 16 (e.g., N times T) clock cycles, a data group needs to be distributed to one of the number of encryption circuits each 4 (e.g., T) clock cycles.

Figure 8B:
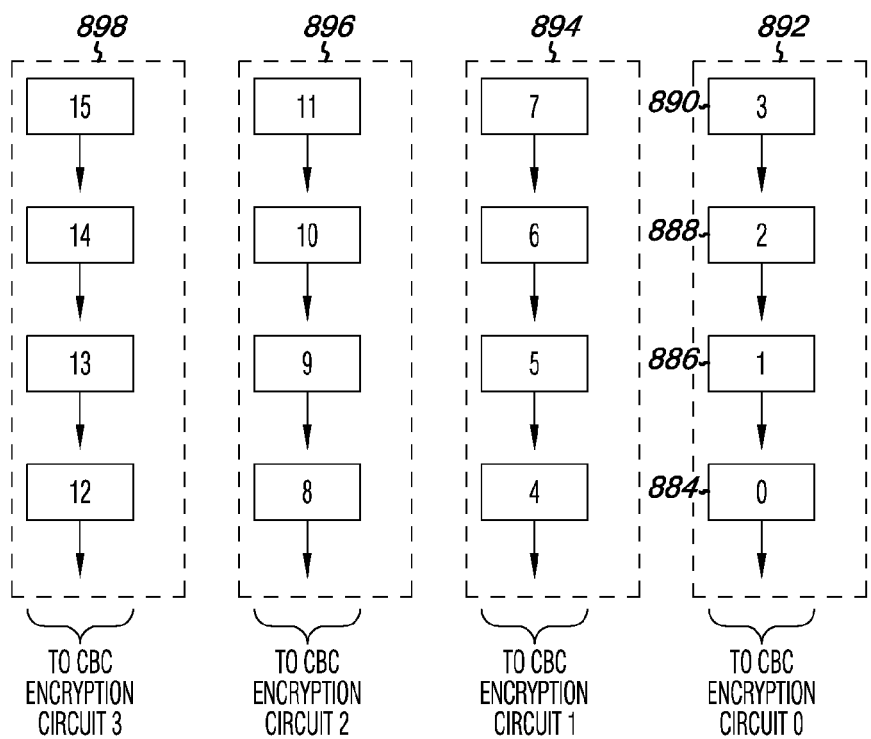
FIG. 8B is a functional flow diagram illustrating distribution of data groups to parallel Advanced Encryption Standard (AES) engines operating in a Cipher Block Chaining (CBC) mode, in accordance with one or more embodiments of the present disclosure.

FIG. 8B is a functional flow diagram illustrating distribution of data groups to parallel Advanced Encryption Standard (AES) engines operating in a Cipher Block Chaining (CBC) mode, in accordance with one or more embodiments of the present disclosure. FIG. 8B further illustrates an encryption method analogous to that which was described above with respect to FIG. 7. FIG. 8B shows parsing an input data stream into a number of data groups, and distribution of the number of data groups to a number of parallel encryption circuits, omitting the encryption apparatus for clarity.

An encryption method according to one or more embodiments of the present disclosure can include parsing an input data stream into a number of groups (e.g., 0-15). The data groups are numbered within the boxes shown in FIG. 8B in the order that they are parsed from the input data stream (e.g., 0, 1, . . . , 15). FIG. 8B illustrates the distribution of the number of groups to a number of associated CBC encryption circuits. For example, a first data group 884 (e.g., data group 0), a second data group 886 (e.g., data group 1), a third data group 888 (e.g., data group 2), and a fourth data group 890 (e.g., data group 3) are shown being directed to CBC encryption circuit 0. In other words, a first plurality of data groups 892 is directed to CBC encryption circuit 0, the first plurality including individual data groups 0-3, e.g., 884, 886, 888, and 890.

As is further shown in FIG. 8B, a second plurality of data groups 894 (e.g., data groups 4-7) is shown being directed to CBC encryption circuit 1, a third plurality of data groups 896 (e.g., data groups 8-11) is shown being directed to CBC encryption circuit 2, and a fourth plurality of data group 898 (e.g., data groups 12-15) is shown being directed to CBC encryption circuit 3. In other words, the number of groups is distributed in a round robin sequence among a number of parallel encryption circuits operating in a cipher block chaining mode, a plurality of groups being distributed per each selection of a particular encryption circuit in the round robin sequence.

Figure 8D:
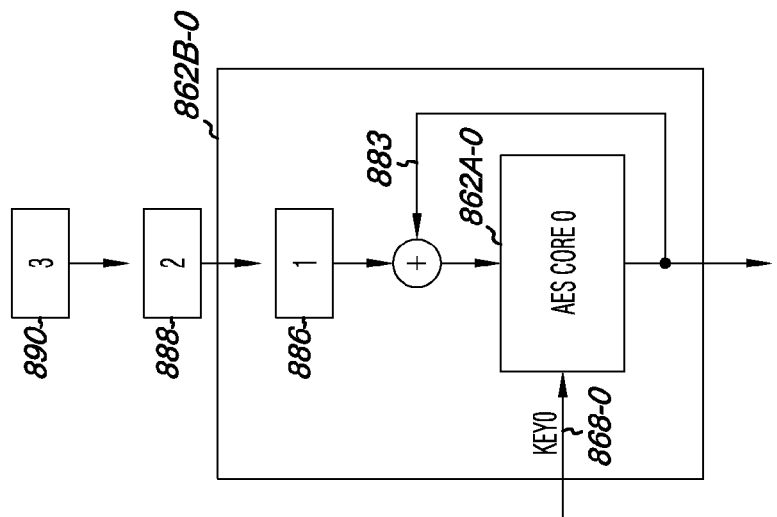
FIG. 8D is a functional flow diagram illustrating processing a subsequent data group of a CBC chain by an AES engine operating in a CBC mode using feedback, in accordance with one or more embodiments of the present disclosure.
Figure 8C:
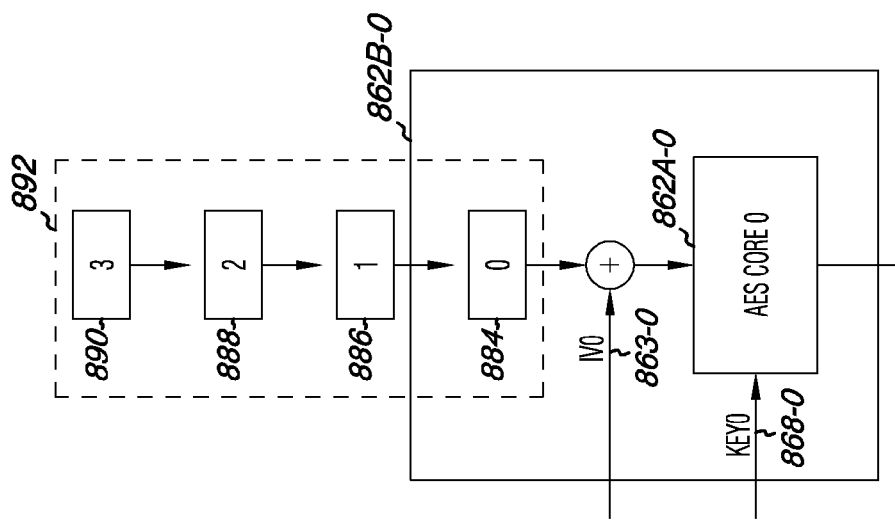
FIG. 8C is a functional flow diagram illustrating processing a first data group of a CBC chain by an AES engine operating in a CBC mode using initialization vectors, in accordance with one or more embodiments of the present disclosure.

FIG. 8C is a functional flow diagram illustrating processing a first data group of a CBC chain by an AES engine operating in a CBC mode using initialization vectors, in accordance with one or more embodiments of the present disclosure. A first data group of a CBC chain can be a first of multiple data blocks comprising a chain of data to be processed sequentially by an AES engine operating in CBC mode. As detailed above with respect to FIG. 4B, according to one or more embodiments, initialization vectors are combined, e.g., by an XOR function, with a first number of bytes of an input data chain to a particular AES engine (operating in CBC mode). Thereafter, some portion of encrypted output (ciphertext) is fed back and used for combining with subsequent bytes of the input data chain to a particular AES engine (operating in CBC mode). As shown in FIG. 8C, one group, e.g., 884, of a plurality of data groups, e.g., 892, is processed at a time through a respective one of the number of parallel encryption circuits at a data processing rate. For example, data group 0 is directed into AES engine 862B-0 operating in CBC mode, combined with initialization vectors 863-0, and the result is directed into an AES engine operating in ECB mode, e.g., 862A-0 for encryption. As is shown in FIG. 8C, AES engine 862A-0 encryption is based on a key, e.g., 868-0 that is received.

FIG. 8D is a functional flow diagram illustrating processing a subsequent data group of a CBC chain using feedback by an AES engine operating in a CBC mode, in accordance with one or more embodiments of the present disclosure. A subsequent data group of a CBC chain can be other than a first data group of a particular chain of data to be processed sequentially by an AES engine operating in CBC mode. For example, a subsequent data group of a CBC chain can be subsequent data blocks making up the chain, such as a second, third, forth data block, etc.

According to one or more embodiments, some portion of encrypted output (ciphertext) is then fed back (instead of the initialization vectors) and combined, e.g., by an XOR function, with subsequent bytes of the input data chain. For example, some portion of the output from encrypting data group 0, e.g., 884 in FIG. 8C, is fed back at 883 and combined with data group 1, e.g., 886, and the result is directed into the AES engine operating in ECB mode, e.g., 862A-0 for encryption. As is shown in FIG. 8D, AES engine 862A-0 encryption is also based on the key, e.g., 868-0. The reader will appreciate that similarly, some portion of the output from encrypting data group 1, e.g., 886, will be fed back and used for encrypting data group 2, and some portion of the output from encrypting data group 2 will be fed back and used for encrypting data group 3. In this manner, data groups of a plurality of data groups are processed one at a time through an encryption, but processed together in the sense that they are related by the feedback from one data group to another within their respective plurality of data groups.

It is desirable that the number of groups are distributed to the number of parallel encryption circuits such that transfer of a next plurality of groups to a particular encryption circuit is completed just as processing of the preceding plurality of groups by the encryption circuit is completed (e.g., distribution of a next plurality of data groups is completed just as encryption circuit 0 completes processing data group 3 and is ready to process a first data group of a next plurality of data groups).

Assuming the input data stream form which the data groups shown in FIG. 8B are derived is from a Serial Advanced Technology Attachment (SATA) interface having an uppermost throughput rate, the number of parallel encryption circuits needed for "on the fly" (e.g., continuous) encryption is at least the uppermost throughput rate divided by the data processing rate. For example, assuming a SATA interface uppermost throughput rate of 300 MB/s, and a data processing rate is 75 MB/s, then the number of parallel encryption circuits to provide continuous encryption capability is at least four. According to one or more embodiments of the present disclosure, an input data stream can be made up of 512 byte data packets, which are parsed into 16-byte groups, with four groups being distributed per each selection of a particular encryption circuit in the round robin sequence.

CONCLUSION

The present disclosure includes methods and devices for parallel encryption/decryption. In one or more embodiments, an encryption/decryption device includes an input logic circuit, an output logic circuit, and a number of encryption/decryption circuits arranged in parallel between the input logic circuit and the output logic circuit. Each encryption/decryption circuit is capable of processing data at an encryption/decryption rate, and the number of encryption/decryption circuits is equal to or greater than an interface throughput rate divided by the encryption/decryption rate.

In the detailed description of the present disclosure, reference is made to the accompanying drawings that form a part hereof, and in which is shown by way of illustration how one or more embodiments of the present disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the extent of the present disclosure.

As used herein, the designators "N" and "M," particularly with respect to reference numerals in the drawings, indicate that a number of the particular feature so designated can be included with one or more embodiments of the present disclosure. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements present. As used herein, the term "and/or" includes any and all combinations of one or more of the associated listed items.

It will be understood that, although the terms first, second, etc. may be used herein to describe various elements, components, regions, layers, and/or sections, these elements, components, regions, wiring lines, layers, and/or sections should not be limited by these terms. These terms are only used to distinguish one element, component, region, wiring line, layer, or section from another region, layer, or section. Thus, a first element, component, region, wiring line, layer or section discussed below could be termed a second element, component, region, wiring line, layer, or section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures rather than an absolute orientation in space. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and should not be interpreted in an idealized or overly formal sense unless expressly so defined herein.

Embodiments of the present disclosure are described herein with reference to functional block illustrations that are schematic illustrations of idealized embodiments of the present disclosure. As such, variations from the shapes of the illustrations as a result, for example, of manufacturing techniques and/or tolerances, are to be expected. Thus, embodiments of the present disclosure should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes and relative sizes, thicknesses, and so forth, are not intended to illustrate the precise shape/size/thickness of a region and are not intended to limit the scope of the present disclosure.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An encryption/decryption device, comprising
an input logic circuit configured to parse data into a number of groups;
an output logic circuit; and
a number of encryption/decryption circuits arranged in parallel between the input logic circuit and the output logic circuit, each encryption/decryption circuit being capable of processing data at an encryption/decryption rate,
wherein the input logic circuit is configured to distribute one group of the number of groups per each selection of a particular encryption/decryption circuit of the number of encryption/decryption circuits in a round robin sequence, wherein the round robin sequence excludes at least one of the number of encryption/decryption circuits to accommodate a rate at which data is received by the encryption/decryption device; and
wherein the number of encryption/decryption circuits are configured to increment first initialization vectors for subsequent use as second initialization vectors.

2. The encryption/decryption device of claim 1, wherein the number of parallel encryption/decryption circuits is equal to or greater than a host interface throughput rate divided by the encryption/decryption rate.

3. The encryption/decryption device of claim 1, wherein the input logic circuit operates to parse an input data stream into a number of groups, and distribute the number of groups to at least some of the number of parallel encryption/decryption circuits according to a distribution order.

4. The encryption/decryption device of claim 1, wherein the number of parallel encryption/decryption circuits operate to process the group of data according to an advanced encryption/decryption standard algorithm in a cipher block chaining mode.

5. The encryption/decryption device of claim 1, wherein engines of the number of parallel encryption/decryption circuits are configured to receive a key, and wherein a key received by one of the encryption/decryption engines is different than a key received by another one of the encryption/decryption engines.

6. The encryption/decryption device of claim 1, wherein engines of the number of parallel encryption/decryption circuits are configured to receive a key, and wherein each encryption/decryption engine is configured to receive a same key as another encryption/decryption engine.

7. The encryption/decryption device of claim 1, wherein at least one encryption/decryption circuit is capable of processing data at a respective encryption/decryption rate that is substantially different from another one of the number of encryption/decryption circuits.

8. A method, comprising
parsing an input data stream received at a host interface into a number of groups; and
distributing the number of groups in a distribution order among a number of parallel encryption/decryption circuits having an encryption/decryption circuit data processing rate; and
using incremented previously-used initialization vectors by the number of parallel encryption/decryption circuits;
operating the number of parallel encryption/decryption circuits in an electronic codebook mode,
wherein distributing the number of groups includes one group being distributed per each selection of a particular encryption/decryption circuit in a round robin sequence, wherein the round robin sequence excludes at least one of the number of parallel encryption/decryption circuits to accommodate a rate at which the input data stream is received at the host interface.

9. The method of claim 8, further comprising:
combining initialization vectors with a first number of groups to each of the number of parallel encryption/decryption circuits; and
combining an encrypted output of each of the number of parallel encryption/decryption circuits with a second number of groups to each of the number of parallel encryption/decryption circuits.

10. The method of claim 8, wherein the number of parallel encryption/decryption circuits is at least a maximum throughput rate of the host interface divided by the data processing rate.

11. The method of claim 8, wherein using incremented previously-used initialization vectors includes incrementing initialization vectors of one of the number of parallel encryption/decryption circuits for subsequent use as initialization vectors of another one of the number of parallel encryption/decryption circuits.

12. A method, comprising
parsing, via a hardware interface, an input data stream into a number of groups, the input data stream having a first rate; and
distributing the number of groups in a round robin sequence among 3 of 4 parallel encryption/decryption circuits operating in an electronic codebook mode, one group being distributed per each selection of a particular encryption/decryption circuit in the round robin sequence; and
processing a particular group at a time through one of the 3 of 4 parallel encryption/decryption circuits at a data processing rate, wherein the 3 of 4 parallel encryption/decryption circuits accommodate the first rate, and wherein the first rate is at most 3 times an uppermost throughput rate of the hardware interface divided by the data processing rate.

13. The method of claim 12, wherein the data processing rate is an encryption/decryption rate.

14. The method of claim 12, wherein the encryption/decryption circuit implements an Advanced Encryption Standard (AES) algorithm in electronic code book mode.

15. The method of claim 12, wherein initialization vectors are combined with a first number of groups to each parallel encryption/decryption circuit, and an encrypted output of each respective parallel encryption/decryption circuit is combined with a second number of groups to each respective parallel encryption/decryption circuit.

16. The method of claim 12, wherein initialization vectors are combined with a first group to each parallel encryption/decryption circuit, and an encrypted output from a preceding group of each parallel encryption/decryption circuit is combined with a succeeding group to each respective parallel encryption/decryption circuit.

17. The method of claim 12, including:
incrementing initialization vectors for a first parallel encryption/decryption circuit; and
using the incremented initialization vectors as initialization vectors for a second parallel encryption/decryption circuit.

18. The method of claim 12, wherein:
distributing one of the number of groups to an encryption/decryption circuit takes T clock cycles; and
processing one of the number of groups at a time through an encryption/decryption circuit takes 3T clock cycles.

* * * * *